Aug. 12, 1969        H. PERSSON        3,460,432

SHEET METAL AND PLATE DEBURRING MACHINE

Filed Jan. 19, 1967        4 Sheets-Sheet 1

INVENTOR.
HENRY PERSSON
BY Kenwood Ross
ATTORNEY.

INVENTOR.
HENRY PERSSON
BY Kenwood Ross
ATTORNEY.

United States Patent Office 3,460,432
Patented Aug. 12, 1969

3,460,432
SHEET METAL AND PLATE DEBURRING MACHINE
Henry Persson, 224 Glenwood Ave.,
Bloomfield, N.J. 07003
Filed Jan. 19, 1967, Ser. No. 610,395
Int. Cl. B23d 41/06; B27c 5/00; B27b 5/00
U.S. Cl. 90—86                                14 Claims

ABSTRACT OF THE DISCLOSURE

Apparatus for deburring the edges of a workpiece by means for driving the workpiece into and along a corner defined by a workpiece supporting work surface and an upstanding guide with a tool being disposed angularly relative to the two corner-defining elements and intersecting the corner so that a corner of the workpiece is operated upon as the workpiece is driven through the apparatus from a leading side to a trailing side.

BACKGROUND OF THE DESCRIPTION

Field of the invention

Apparatus wherein burrs or sharp edges are removed from a workpiece by moving the workpiece past a stationary cutter.

Description of the prior art

Various processes such as filing, grinding, buffering or electrolytic polishing have been devised for removing the burred or sharp edges from a workpiece, but the conventional methods of deburring or edge conditioning are frequently expensive and time consuming and usually do not offer uniform results.

SUMMARY OF THE INVENTION

My invention relates to new and useful improvements in deburring apparatus for mechanically trimming rough or sharp edges or ends or corners of metallic and non-metallic workpieces.

The physical properties of workpieces contemplated for use herewith and the characteristics of other work performing equipment such as die cutting or disc shearing, sawing, punching, stamping or slitting units usually result in the formation of more or less jagged and burred and feathery sharp and otherwise objectionable edges, dictating a need for the removal of the burrs.

This invention provides a simplified and readily operable power tool for deburring or chamfering or abrading and finishing the sharp edges, ends and corners of stock whereby the operator may quickly, simply and efficiently remove the sharp edges of workpieces with an elimination of the tedious and unsightly hand-filing and/or a tie-up of expensive manpower and machines.

The invention hereof is directed to a mechanical method of removing the burred or feathered edges of a sheet or strip and at the same time of shaping the edges to accurate size, frequently a necessity in the case of precision metal-working industries.

Furthermore, the deburring tool here disclosed may be used as a single unit or it may be operated with other similar tools in tandem or multiple arrangements to reduce sizes in one pass through a plurality of such devices.

It is a primary object of my invention to provide a small, compact bench type open tool incorporating means for advancing a workpiece to a stationary adjustable broach or cutting tool which removes the burrs as the material is fed therepast under a pressure which is set so as not to scratch or scar or otherwise deface the main surface or finish of the strip or sheet.

As still another feature, I provide a broach or cutting tool which may be accurately adjusted and releasably mounted upon the machine whereby the depth and/or angle of its cutting action may be varied, and which may be quickly and easily removed from and replaced in the machine to offer new cutting edges.

Another object is to provide feeding means which not only advances the workpiece relative to the stationary broach, but also urges the workpiece inwardly against the broach to insure a smooth and uniform cutting action, with the advantage that cutters of various shapes may be used to conform to various specified geometric shapes or contours.

It is another object of the invention to provide a deburring device wherein the operator may bring the workpiece to the device or the device to the workpiece, as desired, and may accomplish the finishing action on a certain edge or corner or end of the workpiece by means of a single cutting stroke or pass of the workpiece past a broaching member.

It is a still further object hereof to provide means unitary with the deburring device for aiding in the elimination of the secondary burr usually raised with prior art devices.

As another salient feature, I provide a workpiece feeding means which is adjustably spring loaded whereby the machine may accommodate sheets or plates or strips of varying degrees of hardness and/or of varying thicknesses.

DESCRIPTION OF THE PREFERRED EMBODIMENTS

Figure 1:
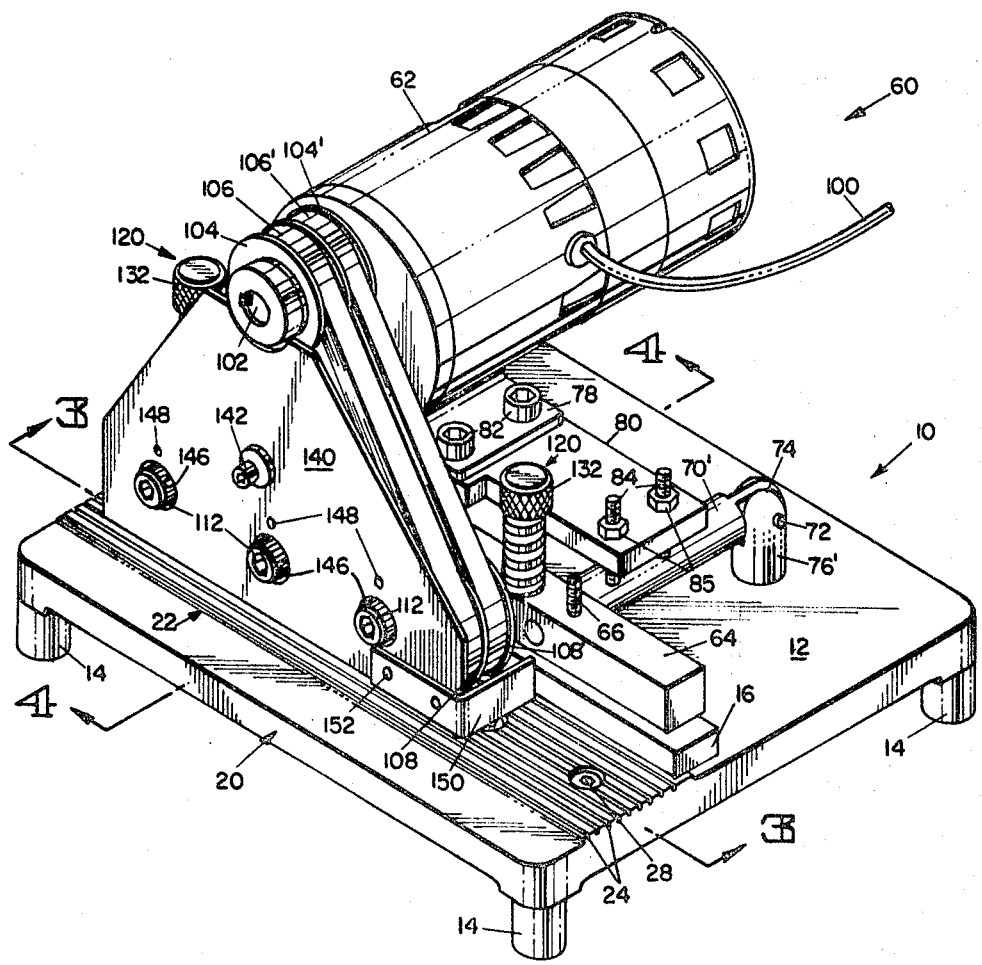
FIG. 1 is a view in perspective of a deburring machine embodying my invention.

With detailed reference now to the drawings, my deburring machine generally comprises a workpiece supporting table or bed or platform or base 10, a workpiece deburring subassembly 40 stationarily secured to said table or bed or base, and a motor driven workpiece feeding subassembly 60 hingedly connected to said table or bed or base.

Workpiece supporting table or bed 10 comprises a horizontally-extending plate or base 12 of square or rectangular or other configuration and having depending legs or feet or bumpers 14 fixed to or integral with its underside at the corners thereof in order that said plate or base may be conveniently supported upwardly of a work bench or other suitable supporting surface. Means may be provided for securing the table or bed to the work bench or other supporting surface of a table or pedestal or stand as by suitable bolting or clamping.

A longitudinally-extending guide 16, fixed to the upper planar surface of base 12 as by bolts or screws 18, is disposed in spaced parallel relation to a forward or outboard longitudinal edge or side face 20 of the base so as to define a workpiece guideway 22 adjacent and inwardly of said edge or side face and upon the upper planar surface of the latter for receiving thereupon, in a supporting manner, a workpiece W, and for allowing a sliding movement of same relative thereto.

The outboard face of the guide forms a surface against which an edge of the workpiece may be brought to bear and relative to which it may be caused to move from the leading edge at one end of the structure to the trailing edge at the opposite end of the structure.

A plurality of equi-spaced parallel and longitudinally-extending grooves 24 may be machined or otherwise formed in guideway 22 to facilitate the movement of workpiece W along and relative thereto.

Figure 3:
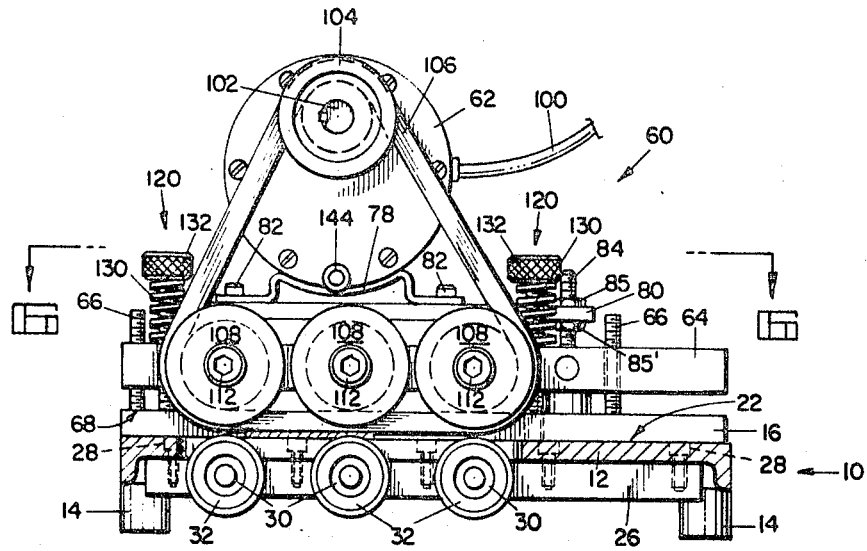
FIGS. 3 and 4 are views in section on the lines 3—3 and 4—4 respectively of FIG. 1.
Figure 4:
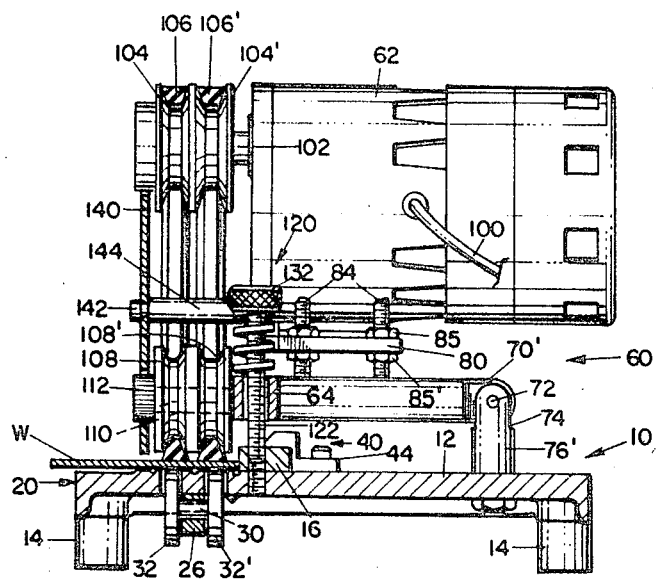

A longitudinally-extending roller-support bar 26 (FIGS. 3 and 4), is stationarily secured to the lower surface of plate 12 in spaced parallelism to and inwardly of edge or side face 20 as by screws or bolts 28 extendible downwardly through suitable openings in guideway 22.

A plurality of spaced, parallel roller pins 30 are stationarily fixed in said roller-support bar and extend transversely therethrough and outwardly thereof at the opposite outboard and inboard longitudinal faces thereof, each said pin having an outboard and inboard guide roller 32 and 32' respectively journalled thereon adjacent the respective outboard and inboard longitudinal faces.

Said guide rollers are formed from a highly wear resistant metal such as stainless steel or the like and are preferably, though not obligatorily, machined to a mirror finish to facilitate the passage of a workpiece thereover.

Guide rollers 32 and 32' are freely rotatable within the respective of a pair of spaced parallel longitudinally-extending outboard and inboard roller slots 34 and 36 which extend downwardly through plate 12 in the workpiece guide way 22 thereof and forwardly of the outboard face of guide 16, the outboard guide rollers 32 being disposed adjacent the outboard longitudinal face of roller-support bar 26 to rotate in the outboard roller slot 34, and the inboard guide rollers 32' being disposed adjacent the inboard longitudinal face of the roller support bar to rotate in the inboard roller slot 36.

Roller pins 30 are strategically positioned at a distance below the horizontal plane of plate 12, and guide rollers 32 and 32' are of a diameter, such that, with the guide rollers extendible into their respective slots 34 and 36, the uppermost peripheral surfaces of the rollers are disposed in a horizontal plane slightly upwardly of the horizontal plane of workpiece guideway 22, thereby to provide a bearing support for workpiece W as it is passed thereover.

Figure 5:
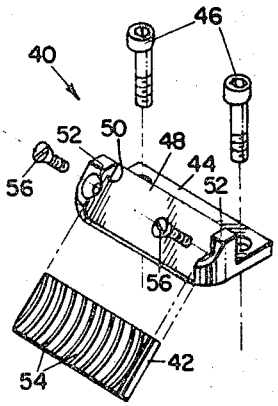
FIG. 5 is an exploded view in perspective of the workpiece deburring component of the invention and its supporting parts.

The workpiece deburring subassembly 40, which is disposed closely adjacent guide rollers 32, 32', is stationarily secured to plate 12, and comprises a broach 42 adjustably mounted in a saddle 44 secured to the upper surface of plate 12 rearwardly of guide 16 as by suitable bolting 46. Saddle 44, best seen in FIG. 5, includes an upstanding support 48 having an angularized or inclined forwardly-facing recess 50 machined or otherwise formed in its inclined forwardly-facing face to define a pair of end abutments 52, 52, one at each thereof.

Broach 42, planar or concave or arcuate in form, is provided with a plurality of equi-spaced, concentric and arcuate trimming or cutting edges or teeth 54 extending laterally of its forwardly-facing face and may be adjustably and slidably receivable in recess 50 so as to be fixed in any desired position of adjustment relative to the recess as by a pair of lock screws 56 each threadedly engaged in an end abutment 52 of support 48 in manner such that a portion of the head of each lock screw overlies and may be brought to bear against an adjacent end of the broach.

By the simple expedient of loosening the lock screws, the broach may be manually moved upwardly or downwardly along and relative to the incline of recess 50 thus to project a lesser or greater area respectively of the lower portion of the cutting edges 54 of the broach in the path of movement of the workpiece so as to remove the burrs from and to obtain the desired contour of the edge of the workpiece and to allow a larger or smaller chamfer according to the operator's desires.

Similarly, as the cutting edges at one longitudinal edge of the broach become worn or dull, the broach may be removed from its seated position, rotated, and reinserted with the opposite longitudinal edge of the broach now being in operative position. Or the broach may be of such design that its opposite face may be placed into operative position by the reversing thereof.

Figure 2:
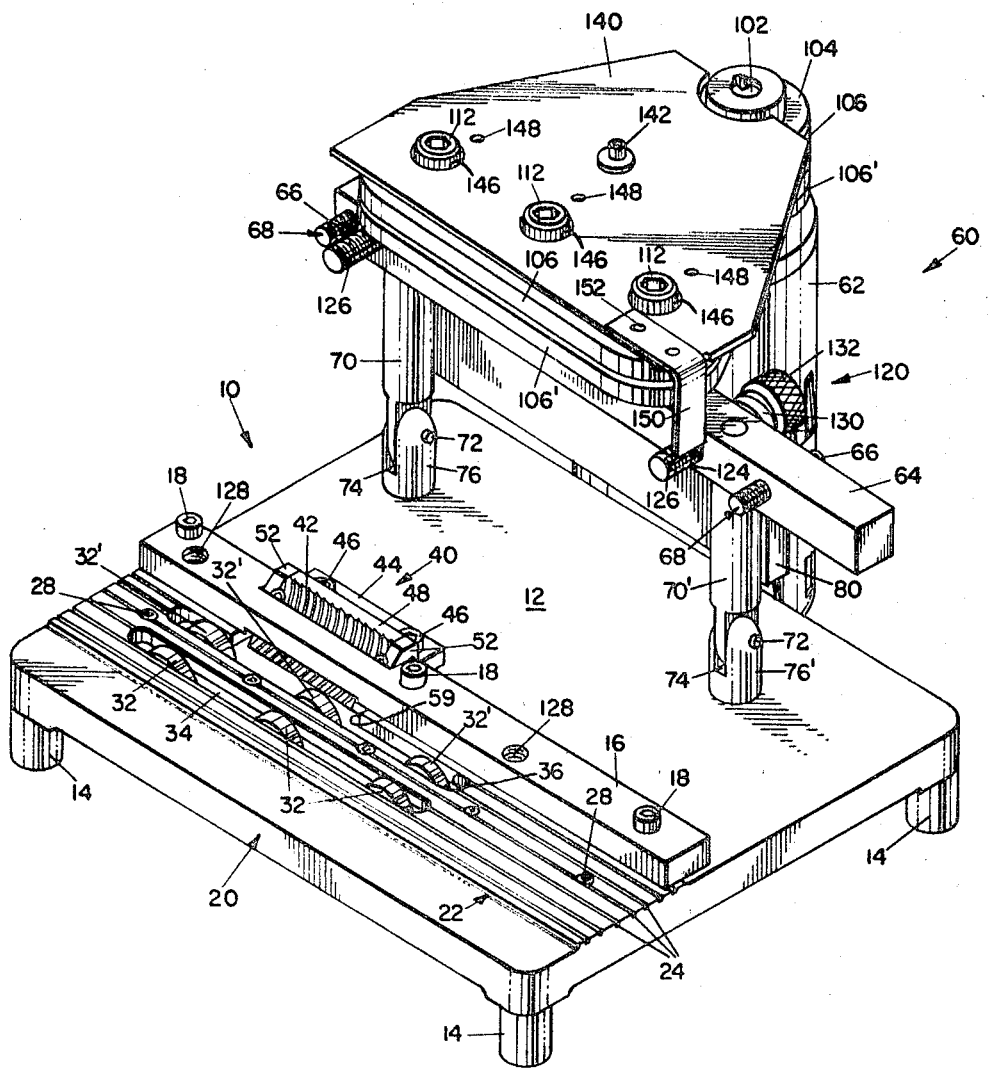
FIG. 2 is a view in perspective, similar to FIG. 1, with the workpiece feeding assembly swung out of operative position to provide access to the workpiece deburring component.

Preferably the laterally disposed trimming or cutting edges are arcuate in form as said teeth extend laterally across the face of the broach from one side to the other. As indicated in FIG. 2, the active and effective trimming or cutting edge of the teeth would be to the right, or on the convex side of the arcuate teeth, with the movement of the workpiece being from the right to the left.

Guide 16 is provided with a cut out 58 and plate 12 is provided with a cut out or well 59 (FIG. 2) intersecting inboard roller slot 36 thereby to permit the insertion of support 48 of saddle 44 thereinto so that the operative portions of cutting edges 54 of broach 42 extend into the path of workpiece W, the cutting edges being so disposed that they face the workpiece thereby to debur that edge of the workpiece disposed adjacent the juncture of guide 16 and plate 12 as the workpiece is moved therepast, with any chips falling through inboard roller solt 36 and into a suitable receptacle (not shown) disposed below the plate or base.

Figure 6:
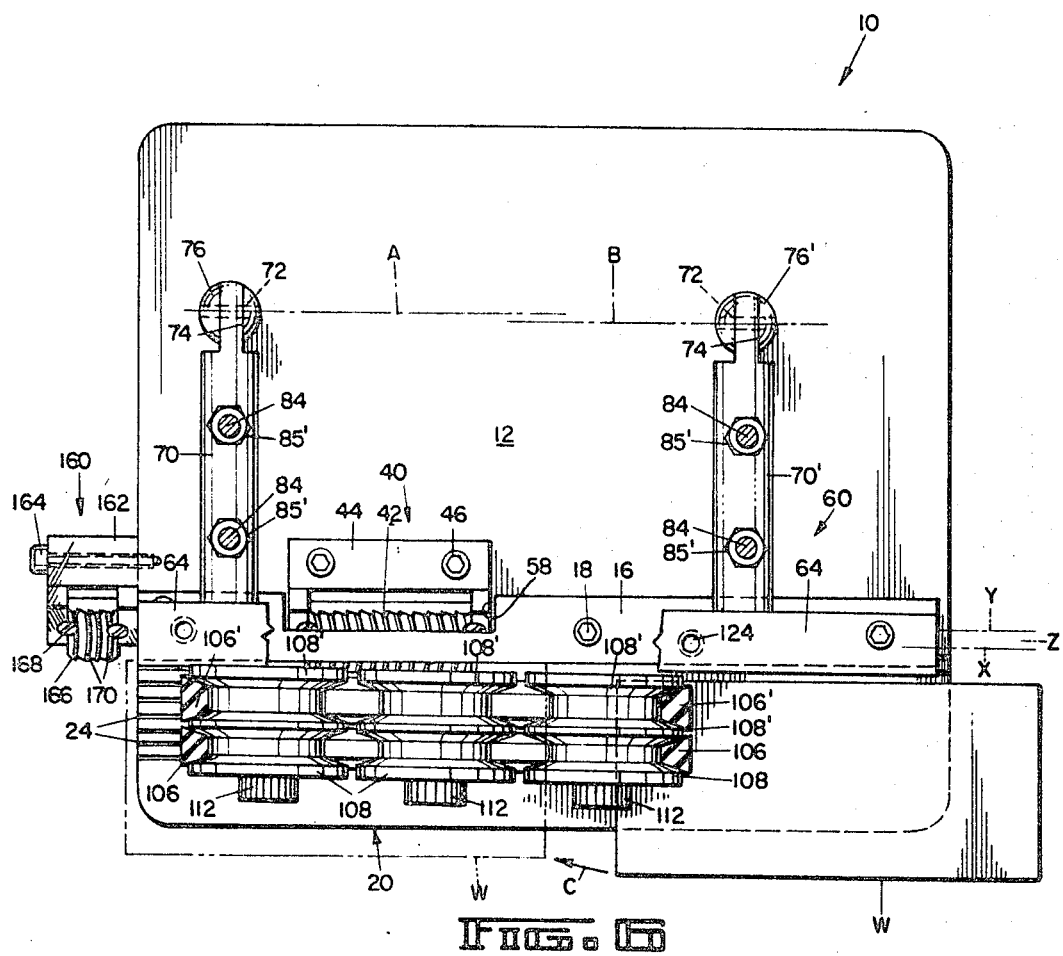
FIG. 6 is a view in section on the line 6—6 of FIG. 3, with parts broken away for purposes of clarity.

As shown in FIG. 6, the workpiece feeding subassembly 60 is disposed upwardly of the plane of table or bed 10, and its horizontal central axis is so disposed, relative to the horizontal central axis of the table or bed, that a workpiece, being moved thereby along the workpiece guideway, is biased inwardly toward guide 16 and broach 42.

The workpiece feeding subassembly 60 includes a prime power unit such as an electrically powered motor 62 supported upwardly of the plane of plate or base 12 as by a supporting framework. A longitudinally-extending pulley arm 64 is disposed in adjustable vertically-spaced parallel relation relative to guide 16 as by a pair of longitudinally-spaced vertically-extending thickness compensating jack screws 66 threadedly engaged in the pulley arm and having lower ends 68 adapted to bear against the upper planar surface of guide 16. By appropriate rotation of the jack screws, vertical adjustability for varying the vertical spacing between the pulley arm and guide is allowed; hence, different thicknesses of stock or workpieces may be compensated for by way of elevating the workpiece feeding subassembly upwardly of the table or bed 10 according to the requirements of specific use.

Referring to FIG. 6, it will be observed that at the feeding or rightward end of the machine the longitudinal central axis of pulley arm 64 denoted by X is displaced outwardly several degrees relative to the longitudinal central axis of guide 16 denoted by Y to define an angular relationship as to each other, the angle being denoted by Z.

Pulley arm 64 is pivotally related to plate or base 12 by means of a pair of longitudinally-spaced horizontally-disposed cross arms 70 and 70' fixed at their forward or outboard ends to pulley arm 64 and pivoted at their opposite rearward or inboard ends by pins 72 receivable within bifurcations 74 in the upper ends of longitudinally-spaced posts 76 and 76' respectively fixed to and extending vertically-upwardly from plate or base 12 inboard of the pulley arm.

The central axis A of post 76 is disposed rearwardly of the central axis B of post 76', while the cross arms 70 and 70' are of equal length, all whereby the axial angularization of pulley arm 64 relative to guide 16 is achieved.

Motor 62 is provided with a mounting bracket 78 of conventional design whereby the motor may be seated upon and secured to a horizontally-disposed, longitudinally-extending support 80 as by screws or bolts 82 which extend downwardly through the motor mounting bracket and into appropriately aligned openings in the support. Support 80, disposed rearwardly or inboard of pulley arm 64, extends between cross arms 70 and 70' and is adjustably secured to the upper surfaces thereof as by studs 84 fixed to the cross arms and extending upwardly through appropriate openings in the support, said studs having nuts 85 and 85' threaded thereon, nut 85 being disposed upwardly of and bearing on the upper planar surface of support 80 and nut 85' being disposed below and bearing on the lower planar surface of support 80, all whereby the vertical positioning of the support on the studs may be adjusted to the end that the belts, to be described, may be tightened.

Motor 62 may be connected to a suitable external electrical power source by means of a power line 100, and carries an output or driven shaft 102 extending horizontally outwardly from the forward or outboard motor end face and mounting a pair of contiguous upper twin V-pulleys 104 and 104', each said V-pulley having a V-belt 106 and 106' entrained therearound.

V-belts 106 and 106' are also entrained around a trio of pairs of contiguous lower twin V-pulleys 108 and 108' respectively disposed below upper pulleys 104 and 104' respectively for the interconnecting of the respective said upper pulley and said lower pulleys via the respective belt, the pulleys being arranged in the form of an equilateral triangle bounded by upper pulleys 104, 104', lower pulleys 108, 108', and belts 106, 106' entrained therearound and driven thereby.

Each of the pairs of lower pulleys 108, 108' is journalled upon a shaft 110, there being three such shafts equispaced as to each other and extending horizontally outwardly from the forward or outboard face of pulley arm 64 in manner so as to be disposed in parallelism with the horizontal plane of guideway 22, and in transverse relationship to the longitudinal guideway axis.

Each said pair of lower pulleys 108, 108' is in vertical alignment with a respective one of the pairs of outboard and inboard guide rollers 32, 32' respectively, all in order to achieve a maximum of pressure in the vertical lines intersecting the pulley and roller centers.

Shafts 110 are threaded at their rearward or inboard ends in appropriate openings provided in pulley arm 64, and are each provided with a knurled bolt head 112 to facilitate ready removal thereof and the removal of lower pulleys 108, 108', from the machine.

Shafts 110 are positioned and spaced along the pulley arm so as each to be disposed in substantial vertical alignment with one of the roller pins 30 carried by roller support bar 26, all in manner whereby each pulley 108 rotates in the vertical plane of a respective outboard guide roller 32 disposed therebelow, and whereby each pulley 108' rotates in the vertical plane of a respective inboard guide roller 32' disposed therebelow.

Lower pulleys 108 and 108' are of such diameter that the respective belts 106 and 106' entrained therearound are spaced slightly above workpiece guideway 22 to permit the insertion of workpiece W between the belts and guide rollers 32 and 32', but with sufficient bearing contact being made by the belts upon the workpiece as to urge same downwardly against rollers 32 and 32' and to draw the workpiece along guideway 22 to broach 42 of workpiece deburring subassembly 40 and to move the workpiece therepast, all the while urging the workpiece inwardly against guide bar 16.

Pressure adjusting means, generally indicated by 120, is provided for adjusting the downward pressure exerted by the belts upon the workpiece in the form of a pair of longitudinally-spaced vertically-disposed shafts 122 which extend loosely each through one of a pair of longitudinally-spaced vertically-disposed openings 124 in pulley arm or bar 64, said shafts having lower threaded ends 126 for engagement in appropriately aligned vertically-disposed threaded openings 128 in guide bar 16.

Each said shaft is provided with a compression spring 130 sleeved thereon and is capped by a manually-engageable knurled head 132 to facilitate rotation thereof, the compression spring being nested between the respective lower surface of head 132 and upper surface of pulley arm or bar 64.

Rotation of head 132 in one direction increases the compression on spring 130 whereby pulley arm or bar 64 is urged downwardly carrying pulleys 108, 108' downwardly therewith to move belts 106, 106' into greater bearing contact with the upper surface of the workpiece disposed therebelow. Rotation of head 132 in an opposite direction reduces the compression on spring 130 permitting pulley arm or bar 64 and pulleys 108, 108' to move upwardly so as to decrease the bearing pressure of belts 106, 106' against the workpiece. Thus the pressure adjusting means will be observed to hold the belts tightly against the respective rollers with the workpiece therebetween.

By turning downwardly on the springs, an increased pressure upon and hence feed of the material is achieved and by turning same upwardly, a decreased pressure is achieved, according to the work requirements. For instance, with a stainless steel or similarly hard workpiece, an increased pressure may be demanded.

A vertically-disposed protective plate 140 is provided forwardly or outwardly of lower pulleys 108, 108' and is fixed to motor 62 as by a horizontally-inwardly extending bolt 142 threaded in a boss 144 (FIG. 3) provided at the outboard end of the motor housing. Plate 140 is suitably apertured as at 146 to permit the passage of bolt heads 112 therethrough. Additional openings 148 may be provided in plate 140 adjacent the knurled bolts 12, same functioning as oil holes permitting lubrication of shafts 110.

A finger guard 150 fixed to plate 140 as by rivets 152 or equivalent is disposed immediately above guideway 22 adjacent the set of lower pulleys to which the workpiece is initially fed (i.e. that set of pulleys to the right as seen in FIGS. 1 and 2). The finger guard serves as a stop whereby the fingers of the operator will not be drawn below or against the lower pulleys as a workpiece is being fed through the machine.

The tension in belts 106, 106' may be adjusted by moving support 80 upwardly or downwardly upon the threaded studs 84, such adjustment being necessary to compensate for any elongation in the belts after long-continued use.

In FIG. 6, the deburring machine has been modified by the addition of supplemental trimming means, generally indicated by 160, pivoted to an end wall of plate 12, said supplemental trimming means being disposed at the end of guideway 22 for the purpose of trimming any burrs or slivers from workpiece W which may have been produced following machining by deburring subassembly 40.

Supplemental trimming means 160 includes a bracket 162 pivotally connected to an end wall of plate 12 by a pivot bolt 164. Bracket 162 carries a broach 166 similar to broach 42, its forwardly facing face being releasably fixed to bracket 162 as by screws 168 and having cutting edges 170 adapted to be so positioned as to impart a final deburring cut to the edge of the workpiece travelling therepast.

Again with reference to FIG. 6, workpiece W, in the form of a flat metal plate or strip, is moved forwardly along guideway 22 until the leading edge of the workpiece passes below the first set of lower pulleys 108, 108', at which time the workpiece is urged laterally inwardly and to the left as seen in FIG. 6 by the belts 106, 106', it being recalled that the longitudinal axis of pulley arm or bar 64 is offset from that of guide bar 16, wherefore the innermost longitudinal edge of the workpiece is urged inwardly against guide bar 16 and is held thereagainst as it is fed to the left by the belts past deburring subassembly 40 where any burrs are removed from the said innermost longitudinal edge and past supplemental trimming means 160 where any burrs or slivers remaining thereon are removed.

Burrs may be removed from the opposite longitudinal side edge of the workpiece by inverting the workpiece after it clears the machine and returning it to the machine.

One advantage of such a relation of parts as here itemized is that the burred or feathered edge is trimmed off without scratching or defacing the finish of the surface or face of the workpiece because, by reason of the positioning of the broach with the arcuate trimming edges, all portions of the surface or face of the workpiece are spaced or separated from the broach except that portion with the burred or feathered edge. The relation between the trimming edges of the broach and the direction of movement of the workpiece is such that the movement of the workpiece serves to urge the deposits of the accumulated fine residues of the removed burred or feathered edges outwardly of the workpiece through the grooves or recesses between adjacent arcuate teeth, which are angularly disposed in the direction of movement of the workpiece. Under such conditions, there also results from the frictional trimming engagement of the burred edge and the forwardly arched cutting edge, a later side force or thrust tending to deflect or urge the workpiece to the sides of the broach, normal to the direction of movement of the workpiece.

I claim:

1. Apparatus for deburring the edges of a workpiece comprising:
   (a) a slotted table having an uppermost horizontally-disposed workpiece-supporting work surface extending from a leading edge at one side of the table and a trailing edge at the opposite side of the table,
   (b) a vertically-extending guide mounted relative to and upwardly of the work surface,
   (c) workpiece moving roller means journalled in the table and arranged parallel to the guide with uppermost peripheries extending through the slotted table and disposed in a horizontal plane upwardly of the work surface,
   (d) a workpiece feed means including a housing mounted relative to the table and a prime mover and driving and driven pulleys carried by the housing and an endless belt entrained over the pulleys with a lowermost reach spaced above the roller means, and
   (e) cutting means secured to the table and positioned angularly relative to both the work surface and guide with a variable portion of its tool area extending angularly into a corner of the path of movement of the workpiece over the work surface and abutted against the guide upon a sandwiching of the workpiece between the belt and coacting roller means.

2. In the apparatus as defined in claim 1, including, adjustable spring-loaded pressure means for controlling the degree of pressure of the belt upon the workpiece therebelow.

3. In the apparatus as defined in claim 1, including, adjustable thickness compensating jack screws for varying the vertical positioning of the belt relative to the work surface for accommodating workpieces of different thicknesses between the belt and coacting roller means.

4. In the apparatus as defined in claim 1, including, angularizing means for angularizing the longitudinal central axis of the workpiece feed means with respect to the longitudinal axis of the guide for urging a workpiece toward the guide in the course of travel from the leading edge of the trailing edge.

5. In the apparatus as defined in claim 1, including, belt tightening means for adjusting the pulleys with respect to the prime mover.

6. In the apparatus as defined in claim 1, including, releasable adjusting means for varying the angle of the cutting means with respect to the path of movement of the workpiece for varying the angle of the cut.

7. In the apparatus as defined in claim 1, including, means for reversing the cutting tool of the cutting means.

8. In the apparatus as defined in claim 1, including, pivotal means for swinging the workpiece feed means relative to the work surface and the cutting means.

9. In the apparatus as defined in claim 1, with secondary cutting means mounted on the table for eliminating secondary burrs produced by the action of the cutting means.

10. In the apparatus as defined in claim 1, including, mounting means for securing the table to other equipment.

11. In the apparatus as defined in claim 1, the cutting means including a replaceable broach adjustably and angularly mounted in a saddle secured to the plate.

12. In the apparatus as defined in claim 1, the cutting means including a reversible broach adjustably and angularly mounted in a saddle secured to the plate.

13. In the apparatus as defined in claim 1, including, port means in the table for the discharge of chips therethrough from the work area.

14. In the apparatus as defined in claim 1, the roller means including a plurality of rollers arranged in spaced alignment as to each other in a direction extending from the leading edge of the trailing edge of the table.

References Cited

UNITED STATES PATENTS

| | | | |
|---|---|---|---|
| 850,338 | 4/1907 | Bolton | 143—49 |
| 1,292,157 | 1/1919 | Townsend | 90—24.06 |
| 1,933,080 | 10/1933 | Stainfield | 90—86 |
| 2,595,879 | 5/1952 | Pasquier | 144—245 |
| 2,616,501 | 11/1952 | Smith | 143—49 |
| 2,664,123 | 12/1953 | Arvidson | 143—49 |
| 2,726,692 | 12/1955 | Collignon | 144—253 |
| 2,776,679 | 1/1957 | King | 143—49 |
| 2,829,683 | 4/1958 | Skinner et al. | 143—49 |
| 2,969,095 | 1/1961 | Brookhyser et al. | 143—49 |
| 3,100,514 | 8/1963 | Dechau | 144—208 |

GERALD A. DOST, Primary Examiner

U.S. Cl. X.R.

143—49; 144—245